United States Patent [19]

Mold et al.

[11] 4,020,896

[45] May 3, 1977

[54] CERAMIC STRUCTURAL MATERIAL

[75] Inventors: Donald F. Mold; Ronald G. Rice, both of Toledo, Ohio

[73] Assignee: Owens-Illinois, Inc., Toledo, Ohio

[22] Filed: Apr. 29, 1976

[21] Appl. No.: 681,352

Related U.S. Application Data

[62] Division of Ser. No. 491,661, July 25, 1974.

[52] U.S. Cl. .................... 165/10; 65/4 A; 65/33; 65/43; 65/DIG. 7; 65/DIG. 9; 65/152
[51] Int. Cl.$^2$ ................ C03C 29/00; C03C 23/20; F28D 17/00
[58] Field of Search .......... 65/33, 43, 4 A, DIG. 7, 65/DIG. 9, 152; 165/10

[56] References Cited

UNITED STATES PATENTS

| | | | |
|---|---|---|---|
| 3,265,480 | 8/1966 | Hicks, Jr. | 65/DIG. 7 |
| 3,279,902 | 10/1966 | Gardner | 65/DIG. 7 |
| 3,347,649 | 10/1967 | Singer, Jr. | 65/DIG. 7 |
| 3,501,048 | 3/1970 | Strickland et al. | 65/4 A X |
| 3,554,720 | 1/1971 | Crepet | 65/43 X |
| 3,771,592 | 11/1973 | Sayers | 65/33 X |
| 3,773,484 | 11/1973 | Gray | 65/33 X |
| 3,871,852 | 3/1975 | Pei | 65/33 X |
| 3,885,942 | 5/1975 | Moore | 65/33 |
| 3,936,288 | 2/1976 | Pei | 65/33 |

Primary Examiner—S. Leon Bashore
Assistant Examiner—Frank W. Miga
Attorney, Agent, or Firm—J. R. Nelson

[57] ABSTRACT

Disclosed is a ceramic structural material, which is particularly useful in combination with an assembly or matrix of integrally fused tubes forming a series of longitudinal parallel passageways. Also disclosed is a method for making such ceramic structural material from rods and frit that are thermally crystallizable into a glass-ceramic. One embodiment of the method involves bundling the rods into a desired configuration, with the frit interposed in the interstices between the rods, and heating the combined rod-frit bundle to sinter or fuse the rods and frit together in a heat treatment schedule that also nucleates and thermally crystallizes the fused rod-frit structure to the final ceramic product. A gas turbine regenerator comprising a combination of the ceramic structural material and a matrix is also disclosed along with the method of making same.

7 Claims, 15 Drawing Figures

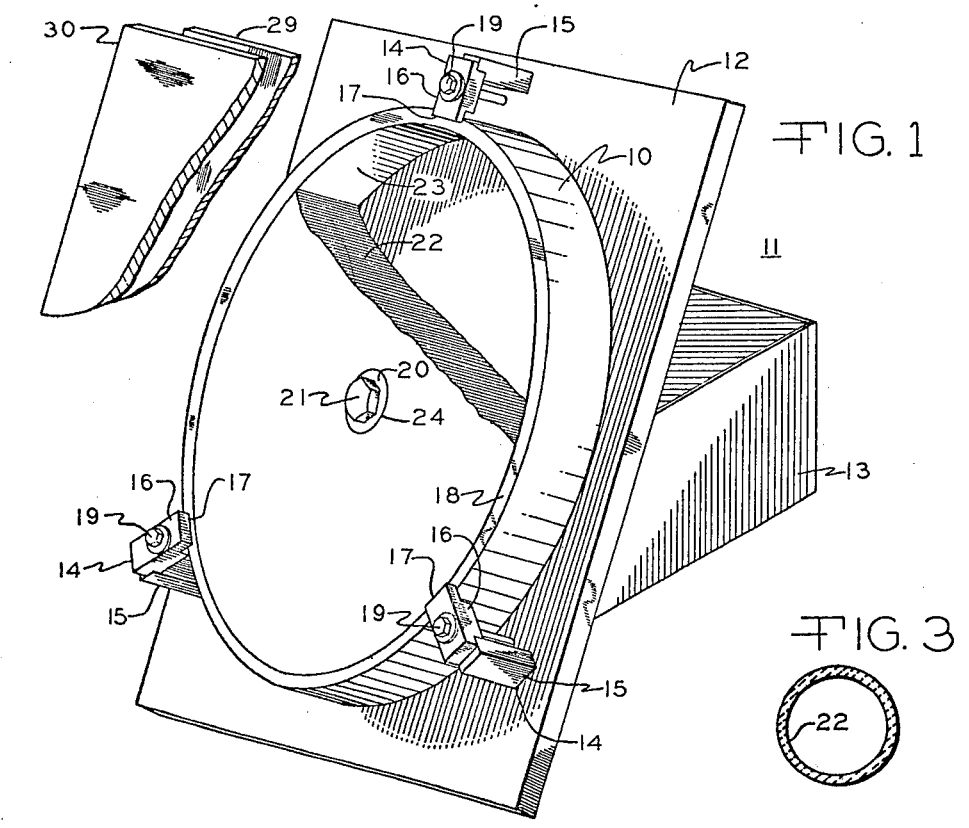
FIG. 1
FIG. 3
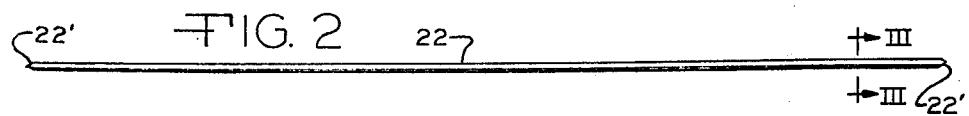
FIG. 2
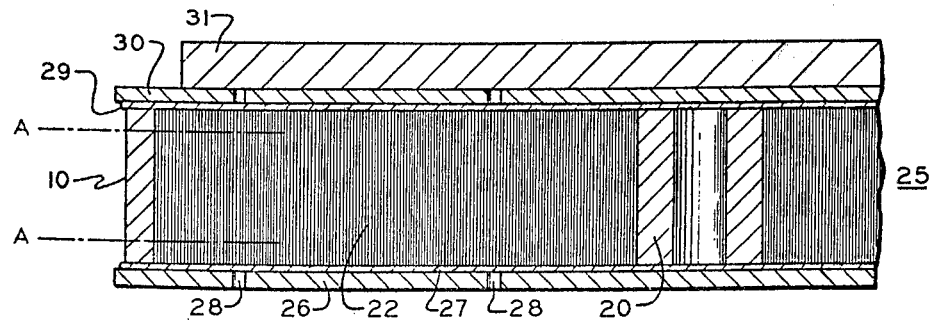
FIG. 4

FIG. 13
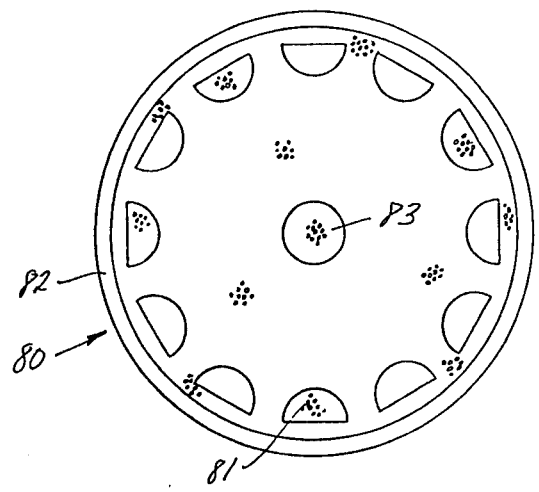
FIG. 14
FIG. 15
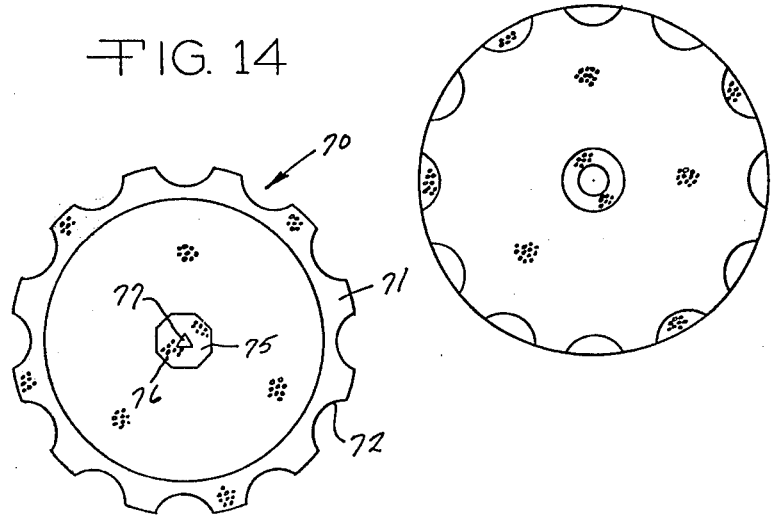

CERAMIC STRUCTURAL MATERIAL

This is a division of application Ser. No. 491,661 filed July 25, 1974.

This invention constitutes an improvement over the structures and methods disclosed in the applications of Y. K. Pei, Ser. Nos. 30,859 (now abandoned) and 146,665, filed (abandoned in favor of Ser. No. 250,550, filed May 5, 1972, now U.S. Pat. No. 3,871,852) in the U.S. Pat. Office on Apr. 22, 1970, and May 25, 1971, respectively, and in the application of Marion I. Gray, Jr., Ser. No. 169,216, filed Aug. 5, 1971, now U.S. Pat. No. 3,773,484.

In the above-noted application of Pei, there is disclosed an assembly or matrix of integrally fused tubes useful as a compact regenerative heat exchanger, buoyancy material, sound absorption material, heat insulation material, and the like. The advantages of this type of structure and the requirements for each of the structures of this type, particuarly a regenerator structure, are set forth fully in the Pei application and need not be repeated here.

In the Pei application, there is disclosed regenerator structure which consists of a plurality of individual, axially parallel, open ended glass-ceramic tubes which are thermally bonded to one another and integrated into an overall regenerator structure. The heating of closed-ended, thin-walled tubes expands them into close contact with each other and into the interstices between tubes to a greater or lesser extent, ideally to an extent to substantially completely fill the interstices between the tubes and between the tubes and walls of a rim and/or a hub which may be used to support or drive a regenerator matrix. In the latter event the resulting tubes become essentially hexagonal. The glass tubes are fusing together and are also undergoing nucleation during the heat treatment, and heating of the structure is continued for a time sufficient to in situ crystallize the glass to an at least partially crystalline material, commonly referred to as a glass-ceramic.

The rim and hub disclosed in the Pei application can be formed of a conventional inorganic crystalline oxide ceramic, made by firing and sintering particulate inorganic oxide materials into a solid which is usually machined to the final desired configuration. The rim and hub were made of materials which have an average coefficient of lineal thermal expansion compatible with that of the low expansion material of the matrix. In a preferred embodiment in the Pei application, the rim and hub were formed from bulk thermally crystallizable glass which has been crystallized to a solid glass-ceramic having physical properties, including thermal expansion and contraction properties, which are close to those of the crystalline matrix comprising the fused tubes.

When making a regenerator having a hub or having a rim and a hub, the rim and/or hub, as stated, can be made of a thermally crystallizable glass that is the restraining means in which the tubes are initially packed, and the rim can be heat treated concomitantly with the tubes, which seal to the rim during the process.

If, however, a rim of considerable thickness is desired and rapid heating rates such as 200° or 300° F per hour are used in the heat treatment of the matrix as just described, the glass of the rim may crack from thermal shock. In such case it is possible to pre-heat the rim to a partially crystallized state until it is a relatively low expansion material having an expansion coefficient less than 20 or $25 \times 10^{-7}$/° C. This can be accomplished by using a suitable nucleation and crystallization heat treatment where the top crystallization temperature is on the order of 1450° to 1600° F and the crystallization is effected only long enough to bring the coefficient of expansion down to the desired range. This partially heat treated rim then can be used as the restraining means without fear of thermal shock. It is also possible to use a fully heat treated rim made of a low expansion sintered ceramic material known in the art, such as cermaic materials that can be made, for instance, from powdered petalite by suitable sintering methods known in the art to form the solid rim. What has been said with respect to the rim also applies to regenerators having a hub of ceramic or glass-ceramic material.

The present invention provides a matrix which may be similar to those disclosed in the Pei and Gray applications, but combines the matrix with a unique support structural material which increases the thermal shock resistance and reduces the uncertainties in manufacturing the combined matrix-support structure.

Two different theories are advanced as to why the hereinbefore discussed dificulties are encountered. It is believed that there are differences in processing characteristics between the solid support material and the tube matrix material. First, there may be some difference in the amount of dimensional change that takes place as the crystallization proceeds. For example, different size crystals may be formed since it may be that the tubes are undergoing significant surface nucleation as opposed to the bulk nucleation of the solid support material.

Alternatively, and perhaps in conjunction with the surface and bulk nucleation difference, the heat transfer characteristics of the solid support material differ from those characteristics of the tube matrix material, causing one to "see" a different temperature than the other during a heat treatment process. As discussed in the Pei application, different temperatures during the heat treatment process can effect the rate of crystal growth, particularly in the second stage of the treatment outlined therein. After the initial stage of the heat treatment a phase transformation starts during the beginning of the second stage of heat treatment. There is a shrinkage in the material during the first stage, and an opposing "negative shrinkage" or slight expansion during the phase transformation portion of the second stage of heat treatment. Thus because of the difference in heat transfer characteristics between the two materials, one material may see a different temperature and be expanding while the other material is shrinking.

Ruptures, distortions and cracks might occur during manufacturing based upon either or both of the above theories. If such failures do not occur during the manufacture of the combined support-matrix structure, then the mechanical strains left in the materials because of the theoretical differences in processing characteristics may result in a failure during use of the combined support-matrix structure in response to high thermal shock in a particular application.

The improvements obtained by this invention, then, resulted from seeking to make the processing characteristics of an essentially solid support material as similar to the processing characteristics of the foraminous matrix as possible, while still retaining the requisite structure strength, and providing an ability to easily initially form the matrix support material in any desired configuration.

These improvements are accomplished by tightly packing or bundling a plurality of individual axially elongated glass rods into a desired configuration with their axes parallel, interposing in the interstices between the rods additional sinterable ceramic material, usually in particle form, constraining the bundle of rods and interposed ceramic material in the desired configuration, and jointly thermally processing the rods and the interposed ceramic material to fuse or sinter the interposed ceramic material and the rods to obtain an integral mass.

The processed interposed ceramic material has substantially the same thermal expansion characteristics as the individual rods have after the subsequent thermal treatment to final crystalline form. When used as a support material for a matrix, the thermally crystallized rods and interposed ceramic material have substantially the same thermal expansion characteristics as the matrix.

In the method taught herein, the rods are made from thermally crystallizable glass, and the sinterable or powdered ceramic material is preferably also a thermally crystallizable glass frit but can also be powdered green ceramic material components that are sinterable to form a cyrstalline material by solid state reaction.

In order to obtain similar nucleation and crystallization on thermal treatment, the rods are advantageously selected with a diameter which is proportionately smaller than the diameter of glass tubes from which the matrix is to be formed. That is, since each glass tube has an inner and an outer surface both available for surface nucleation, and a rod has only an outer surface, the individual rod diameter must be smaller to obtain substantially the same amount of surface area per unit of cross-sectional rod bundle as the same unit of cross-sectional tube bundle.

The step of interposing can be effected by finely dividing the additional sinterable cermaic material, mixing the fine ceramic material into a liquid vehicle, and coating the surfaces of the rods before they are packed into the bundle. The liquid vehicle advantageously contains a binder and a solvent for the binder. When the rods are coated and packed, together in the bundle having desired configuration, the solvent will evaporate and the binder will hold the finely divided ceramic particles in place on the rods, and will further hold the rods together in the desired configuration until the bundle is thermally processed. Thus the bundle of rods can be moved about, assembled with a bundle of tubes for joint thermal processing, and the like, since the binder has given the bundle of rods good "green ware" handling characteristics. Alternatively, the interstices can be filled with the frit after assembly into a bundle, such as by flowing a slurry through the interstices and having a filter medium on the outlet end of the assembly, thus retaining the frit in the interstices.

The structural ceramic material of this invention made by the above method thus achieves processing characteristics that are substantially similar in the surface nucleation and heat transfer areas to a matrix with which the structural cermaic material might be combined and jointly thermally processed. Further, the method of making the structural ceramic material lends itself to applications where previous bulk-process ceramic material could not be used. For example, if a thin protective skin is desired around the periphery of a matrix or other structure, a layer of the rods with the powdered ceramic material in the interstices can be assembled with and around the outside of the matrix bundle. To be effective the layer need be only two to three rods deep.

Accordingly, it is an object of this invention to provide a ceramic structural material having superior properties, and especially a ceramic structural material which does not have the aforementioned deficiencies when used as a support or protective structural material in combination with a foraminous ceramic matrix.

Another object of this invention is to provide a novel matrix and support structure combination with improved manufacturing process results and improved high thermal shock resistance.

A still further object of this invention is to provide a novel method for making ceramic structural material and matrix-support structure combinations.

Other objects, features and advantatages will become apparent from the following description taken in conjunction with the accompanying drawings, in which:

FIG. 1 is a perspective view of a jig assembly utilized in making a portion of an embodiment of the structure of the invention and showing a partial packing of tubes within the structure mounted on the assembly;

FIG. 2 is a side view of a glass tube used in making a portion of the structure of this invention;

FIG. 3 is an enlarged cross-sectional view of the glass tube taken along lines III—III of FIG. 2;

FIG. 4 is a partial cross-sectional view of the structure of FIG. 1 placed within an assembly prior to heat treatment;

FIG. 13 is a top plan view of a glass-ceramic structure with an outer mold that by machining is made into a regenerator wheel of FIG. 15;

FIG. 14 is a top plan view of another embodiment of a heat exchanger of this invention wherein the rim is provided with a series of recesses adapted to receive and engage driving means for the structure; and FIG. 15 is a top plan view of another embodiment of a rotary regenerative heat exchanger of the invention.

Figure 5:
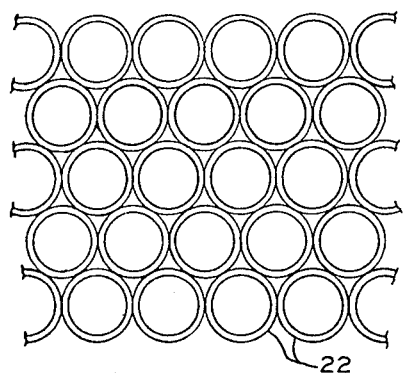
FIG. 5 is a sectional view of a portion of the bundle of tubes of the invention, greatly enlarged, showing the arrangements of the glass tubes prior to being expanded by heat treatment.

As shown in the drawings, FIG. 1, reference number 11 refers generally to an apparatus which is substantially identical to that apparatus illustrated in FIG. 1 of the above-identified application of Y. K. Pei.

As illustrated in FIG. 1, a ceramic rim 10 is mounted on a jig 11 comprising a face board 12 attached to a conventional vibrator 13. Three clamping means 14 are spaced about the edges of face board 12 and removably secure the rim 10 thereto. Each of clamping means 14 comprise a stem portion 15 fastened to the face board, an arm portion 16 disposed at right angles to the stem portion 15 and provided with a finger portion 17 in contact with the upper edge 18 of rim 10. Arm portions 16 are held in engagement with the rim 10 and the stem portion 15 by fastening means 19 passing through arm portion 16 and secured to the face board 12.

A hub 20 may be also removably mounted on the face board 12 and disposed at the center of the rim. Fastener 21 passing through the hub 20 is secured to the face board 12 and maintains the hub in position on the jig. A plurality of hollow, thin-walled thermally crystallizable glass tubes 22 are then closely packed together with the rim in parallel relationship as illustrated in FIG. 1, i.e., the tubes are parallel to the inner wall 23 of the rim and the outer wall 24 of the hub and the longitudinal axes of the tubes are essentially parallel.

Each of the glass tubes 22 shown in FIGS. 1, 2 and 3 have both ends 22' sealed, thus trapping air or another thermally expansible fluid medium therein. A tube 22 may have its ends sealed by simply passing the tube end through a flame. Due to the very small size of the tube, the outer diameter of which may, for example, be about 0.030 inches and the wall thickness may be about 0.001 to 0.003 inches, and sealing is readily achieved. However, the method of sealing the tubes is not a part of this invention, and any of the known methods may be used.

Because it is often desirable and important to have the glass tubes 22 as closely packed as possible so that each tube is in contact with six other tubes, as shown in FIG. 5, the jig 11 is provided with a vibrator 13 which, in turn, causes face board 12 and rim 10 to vibrate (by means not shown). This vibration is imparted to the plurality of glass tubes 22 and assists in more closely packing the tubes as they are placed on top of the tubes which have already been packed. It is to be understood that the rim 10 need not be manually packed, but can be packed by other methods. In either event, the vibration imparted to the glass tubes should be sufficient to ensure the close, tight packing of the tubes within the rim, with each tube in contact with six other tubes.

The assembly 25 comprising the rim 10, hub 20 and the closely-packed glass tubes 22 is removed from the jig 11 and placed upon a stainless steel plate 26 having a silica-alumina (Fiberfrax) cloth 27 on its upper surface, as shown in FIG. 4. Plate 26 is provided with a plurality of perforations 28. Another silica-alumina cloth 29 is placed on the upper surface of the assembly 25, and a second perforated stainless steel plate 30 is placed thereover. A heavy member 31 is finally placed on top of plate 30, and the entire assembly is then placed in a furnace and subjected to heat sufficient to soften the glass walls of tubes 22 and cause the walls to bloat or expand due to the heating of the fluid medium in each tube so that adjoining, contacting wall surfaces are fused together to form a unitary matrix.

It is important to have the ends of each of the tubes 22 in assembly 25 sealed during the heating step, otherwise the tube walls will collapse rather than expand when subjected to this heat. Furthermore, to utilize the heating procedure described above with respect to the FIG. 4 assembly, the length of the tubes should be no longer than the height of the rim 10. As the individual tubes expand, any pair or other gases which remains in the interstices passes through the perforations in the plates 26 and 30. If desired, plates 26 and 30 need not be perforated, and the assembly can be placed under vacuum during the heating step to assist in the removal of any air which is within the interstices between the tubes.

The heating of the thin-walled tubes expands them into close contact with each other and into the interstices between tubes to a greater or less extent, ideally to an extent to substantially completely fill the interstices between the tubes and between the tubes and walls of the rim and hub. In the latter event the resulting tubes become essentially hexagonal. The glass tubes are fusing together where they contact. The tubes are fusing together and are also undergoing nucleation during the heat treatment, and heating of the structure is continued for a time sufficient to in situ crystallize the glass tubes to an at least partially crystalline material, commonly referred to as a glass-ceramic.

In one embodiment the rim and hub are preferably formed of the materials and by the method described hereinafter and illustrated in FIGS. 10, 11 and 12. The rim and hub should have an average coefficient of lineal thermal expansion compatible with that of the material of the matrix. In one embodiment of the invention, the rim and hub are also formed from bundled thermally crystallizable glass rods with the interposed thermally crystallizable frit which can be crystallized to a glass-ceramic having physical properties, including thermal expansion and contraction properties, which are close to, and usually the same as, those of the crystalline matrix comprising the fused thermally crystallized tubes.

After the assembly 25 has been thermally crystallized, and usually after cooling to room temperature, the outer surface portions of the assembly may be removed by sawing with a diamond saw in the direction indicated by lines A in FIG. 4. An assembly of a predetermined thickness is thus obtained, and all of the fused tubes now have open channels since both sealed ends of each tube have been cut away.

In the method of this embodiment of the invention, the ends 22' of tubes 22 are appropriately sealed, e.g., by means of a flame, either before, after, or during the bundling of the tubes. Typically, the tubes are sealed in a gaseous environment, so as to trap the environmental gas within each tube at the surrounding ambient pressure. On heating to effect fusion sealing, the gas within each tube expands so as to prevent collapse and promotes close contact and fusion of the tubes. With the thin-walled tubes used in this inventions, expansion of the entrapped gas causes the tubes to bloat or expand.

Figure 6:
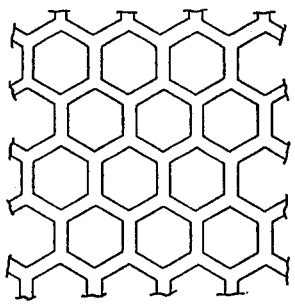
FIG. 6 is a sectional view of a portion of the bundle of tubes of the structure of the invention, greatly enlarged, showing the arrangement of the glass tubes after they have been expanded and crystallized by heat treatment.

In one embodiment the expansion is effected until the space between adjacent tubes is essentially filled. When the tubes are bundled so that each tube is in contact with six adjacent tubes, as shown in FIG. 5, the tubes are reformed into substantiallly hexagonal shape to provide the matrix structure illustrated in FIG. 6. The tube expansion may be stopped short of full hexagonal development, but the wall-to-wall pressure created by even minimal expansion of the tubes has been found effective to form tube-to-tube seals which are sufficiently tenacious to knit the entire aggregate into an integral, unitary structure of good mechanical properties. Conversely, open tubes without internal pressure acting upon each tube will collapse or deform under the influence of gravity where high temperatures soften the glass enough to cause tube-to-tube bonding.

Tubing used in practicing the usual embodiments of the method of this invention have inside diameter to wall thickness ratios of at least 6; substantially lower inside diameter to wall thickness ratios may result in a relative ineffectiveness of the process to urge the tubes into a good fusion bond when using a temperature schedule which is also effective to properly nucleate and crystallize the glass tubes to a glass-ceramic during the expanding and fusion heating cycle. In a now preferred embodiment of the invention the ratio of the inner diameter to the wall thickness of the thermally crystallizable glass tubes is at least 7.2; when tubes having such diameter to wall thickness ratio are employed, the unique structure of the invention is made wherein the open frontal or cross sectional area of the resulting matrix structure is at least 60 percent, and may be on the order of 85 percent or more. In the usually preferred embodiments the maximum inside diameter of the tubing is about 0.1 inch and the wall thickness is from about 0.001 to 0.015 inches. However, tubes of larger internal diameter, up to one-fourth inch or even one inch can be used, so long as the wall thickness to inside diameter ratio is maintained.

Usually, round thermally crystallizable glass tubing is used in forming the matrix structure of the invention. Drawing of round glass tubing to controlled dimensions is an old, established art in industry.

While the assembled tubes 22 can be merely fusion sealed with slight expansion and reformation of the tubes, it is preferred for most applications that the tubes be expanded and reformed into the substantially hexagonal shape during fusion sealing. Greater tube-to-tube pressure is generated causing a more perfect fusion of each tube to the surrounding tubes and tube-to-tube contact area increases from essentially tangential contact with adjacent tubes to essentially full contact, with bonding of the entire periphery of the tubes. Furthermore, as the "triangular" space between each set of three adjacent tubes (see FIG. 5) is substantially reduced in area by expansion and reformation, the pressure drop in the finished product across the honeycomb structure is less than across one in which tubing is round in the final product. The thinner the wall thickness for a given composition and the greater the ratio of the inner diameter to such wall thickness, the more readily the tube can be expanded to a substantially hexagonal tube at a given temperature.

In the application of Gray, a matrix of the type disclosed in the Pei application is reinforced by interposing a finely divided, thermally crystallizable frit or other sinterable ceramic material between the individual, sealed, matrix-defining glass tubes prior to the thermal conversion of the tubes to a glass ceramic. Subsequently, the thermally crystallizable frit or other sinterable material and the individual tubes are jointly thermally processed through successive nucleating and crystallizing steps to simultaneously convert both the tubes and the frit to low expansion glass-ceramic materials having substantially the same thermal expansion characteristics. During this joint thermal processing, the internal pressures generated in the closed tubes and the thermal sintering of the frit combine to compact and to integrate the tube-frit assembly into a single mass. After the nucleation and crystallizing steps have been carried out, the ends of the tubes may be ground or cut off to provide a flow-through matrix through the now opened ends of the tube. The fused and converted frit is interposed between the ground or cut open ends of the tubes, and serves to reinforce the ends of the tubes and to provide an additional, wear-resistant surface for the matrix assembly.

Figure 7:
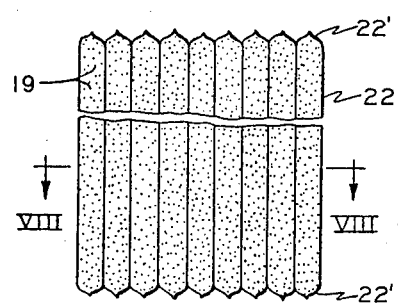
FIG. 7 is an enlarged view of a portion of assembled tubes from a bundle, the tubes being coated with a thermally crystallizable frit.
Figure 8:
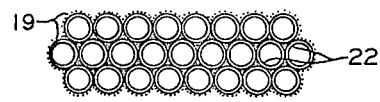
FIG. 8 is a cross-sectional view of the tubes illustrated in FIG. 7, the section being taken along lines VIII—VIII of FIG. 7.
Figure 9:
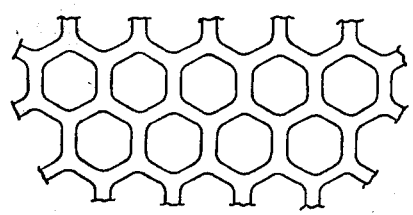
FIG. 9 is a view of the tubes illustrated in FIG. 7 formed into an open end matrix structure.

As shown in FIGS. 7 and 8, each of the glass tubes 22 is coated with a sinterable frit to carry out the method of the Gray application. The frit 19 interposed in the interstices between the tubes is subject to substantial pressures generated by the expansion of the tubing walls. As a result the frit and tubes are sintered and fused into an integral, coherent matrix structure during thermal treatment and later stages of heating convert the thermally crystallizable glass to a glass-ceramic. The open end face of a matrix is shown in FIG. 9 which is formed from bundles of tubing shown in FIGS. 7 and 8. The tube walls in FIG. 9 are therefore insured of support by another tube wall or by the sintered frit in the interstices.

Figure 10:
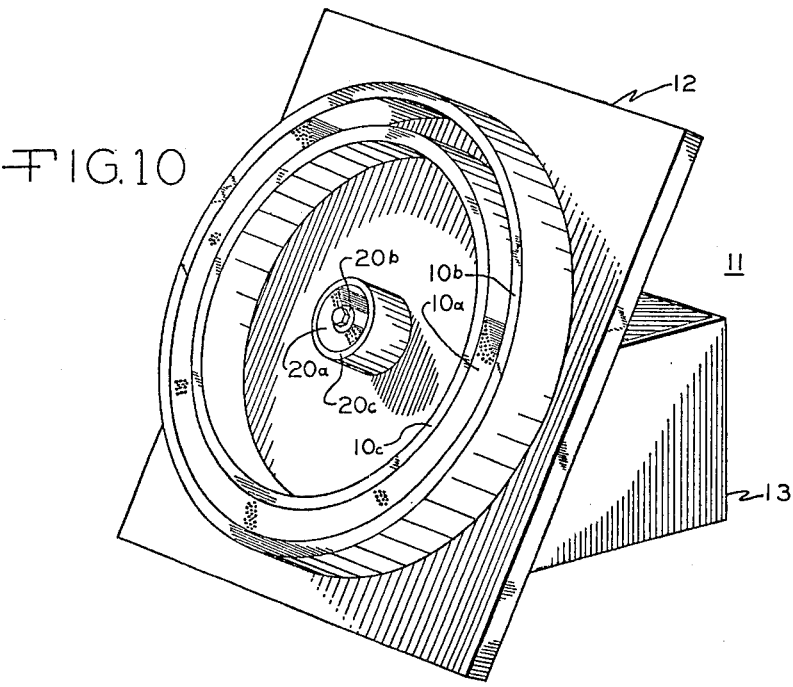
FIG. 10 is a perspective view of a jig assembly utilized in making an embodiment of the novel structural ceramic of this invention.
Figure 12:
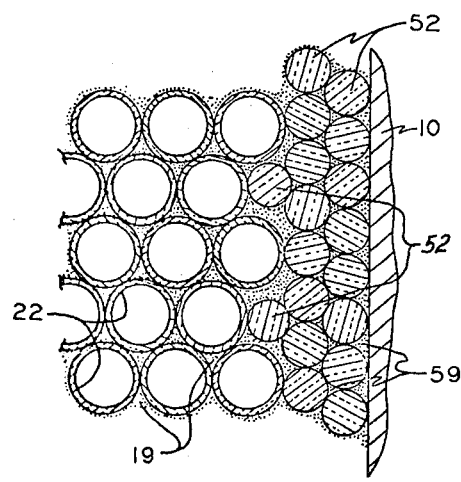
FIG. 12 is an enlarged plan view of a portion of a rim-supported regenerator matrix formed with tubes as illustrated in FIGS. 7 and 8 which are ready to be jointly thermally processed with a rod rim structure formed as illustrated in FIGS. 10 and 11.
Figure 11:
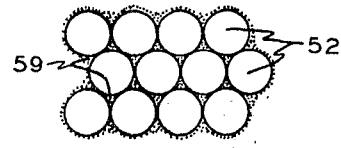
FIG. 11 is an enlarged plan view of a portion of assembled rods from the bundle in the jig assembly of FIG. 10, the rods being coated with a thermally crystallizable frit.

Referring now to FIGS. 10, 11 and 12 there is illustrated apparatus for and a method of forming the low expansion ceramic structural material of this invention, in the form of a rim 10a and a hub 20a to be jointly thermally processed with the matrix made from tubes 22 illustrated in FIGS. 1 through 4.

As shown in FIG. 10, the apparatus designated generally at 11 is substantially identical to the apparatus illustrated in FIG. 1 herein. In this instance, however, the unique low expansion ceramic rim 10a and hub 20a are to be made to replace the rim 10 and hub 20 of FIG. 1.

An outer rim mold 10b and an inner rim mold 10c are removably secured to face board 12 by suitable fastening means such as those indicated at 14 in FIG. 1. Rim molds 10b and 10c are fastened in a spaced relationship to define a mold cavity in which a rim 10a may be built.

Similarly, an outer hub mold 20b and an inner hub mold 20c are removably secured to face board 12 by fasteners 14 and a fastener 21, respectively. The outer and inner hub molds 20b, 20c are fastened in a spaced relationship to define a mold cavity in which hub 20a may be built.

A plurality of solid, thin, axially elongated, rods 52, of thermally crystallizable glass-ceramic material are then closely packed together in the mold cavities to form a rim and a hub configuration. The rods are parallel to each other and to walls of their mold cavities; the rods in the rim configuration being parallel to those in the hub configuration.

A sinterable ceramic material 59, and usually preferably a thermally crystallizable glass frit, is interposed in the interstices between the rods 52 as shown in FIG. 11. The interposition of the frit 59 may be accomplished by finely dividing a sinterable ceramic material, forming a mixture of the fine ceramic material in a liquid vehicle, and coating the rods before they are placed in the mold cavities. As an alternative, the slurry mixture may also be placed in a layer or layers above the rods 59 after the rods are packed in place in the mold cavities, and then urged into the interstices by a vibration-gravity process or a reduced pressure process as discussed in the Gray application.

Because it is often desirable and important to have the glass rods 59 are closely packed as possible so that each rod is in contact with six other rods, as shown in FIG. 11, the jig 11 is provided with a vibrator 13 which causes face board 12, rim molds 10b and 10c, and hub molds 20b and 20c to vibrate. This vibration is imparted to the plurality of rods 59 in the rim and hub mold cavities, and assists in more closely packing the rods as they are placed on top of the rods which have already been packed. It is to be understood that the mold cavities need not be manually packed, but can be packed by other methods, this being a representative showing of bundling rods in a desired configuration with a sinterable ceramic material interposed in the interstices between rods.

In any event, the vibration imparted to the glass rods should be sufficient to ensure the close, tight packing of the rods within the mold cavities, with each rod surrounded by six other rods. It should be noted that the vibration method of packing is also advantageous when the rods are precoated with the frit slurry. The precoated individual rods have the frit slurry in a layer on the surface thereof at a substantially uniform depth when placed in the mold cavities and vibrated, the rods move toward each other and thus urge the previously uniform layer of frit slurry on each rod into the interstices between the rods. By mixing the frit slurry to the proper consistency, sufficient frit may be carried on the rod surfaces to insure that each of the interstices between the rods are substantially filled with frit which may be sintered into a solid ceramic which is fused to all interstially-adjacent rod surfaces.

The packed rim and hub configurations are then cured or allowed to cure so that a solvent ingredient of the liquid vehicle which binds the interposed ceramic material and the rods into an integral mass with good "green ware" handling properties before being thermally processed into an integral ceramic mass.

The mold walls 10c and 20b, 20c may be of any material suitable for the process which follows the bundling and binding into an integral green ware mass. The mold walls need not be glass-ceramic or ceramic when the object is to make a low expansion ceramic structural material in a desired configuration, and not also to concomitantly seal a matrix to the rim or hub, as shown. However, mold wall 10b should be made out of a material which does not crack or deform substantially during any heat treatment of the crystallizable glass assembly, such as a previously crystallized glass-ceramic mold rim of the same composition as the tubes and rods. A layer of silica-alumina (Fiberfrax 970J) paper may be placed between the mold walls 10b and the assembly of glass rods and interposed frit to enable removal of the mold after thermal processing.

If it is desired to manufacture a matrix-rim-hub structure which is to be jointly thermally processed into an integral ceramic mass, the inner rim mold 10c and the outer hub mold 20c can be removed. The space between the inside wall of the rod bundle rim 10a and the outside wall of the rod bundle hub 20a is then filled with tubes 22 in the manner described hereinbefore with respect to FIG. 1. A partial cross-sectional view of such an assembly is illustrated in FIG. 12.

The tubes 22 in FIG. 12 have been shown as having a sinterable frit 19 interposed in the interstices between the tubes, following the teaching disclosed in the Gray application. This is a now preferred embodiment since the tube 22-frit 19 assembly and the rod 52-frit 59 assembly then have the most similar processing characteristics for heat treatment under the theories set forth hereinbefore. It is to be understood, however, that the use of tubes 22 without interposed frit, as illustrated in FIG. 5, in combination with a rod rim assembly and/or rod hub assembly as just described does result in improved manufacturing and operation characteristics, since the rim and hub assemblies are much more similar in processing characteristics than the bulk type support structures of the past.

After packing the area between the hub and rim, the assembly comprising the rim mold wall 10b, rod rim assembly 10a, closely packed tubes 22, rod hub assembly 20a and hub mold wall 20b is then transferred to the apparatus shown in FIG. 4 for a heat treatment process.

It should be noted that frit is also interposed between the tubes 22 and adjacent rods 52. This aids in the sealing of the rod structure to the adjacent tubes. Even in the embodiment wherein frit is not interposed in the spaces between adjacent tubes throughout the tube matrix assembly, the frit is preferably used between rods and adjacent tubes of the matrix structure.

The heating of the assembly will then expand the tubes 22 into close contact with each other and into the interstices between the tubes to a greater or lesser extent, ideally to an extent to substantially fill the interstices between the tubes, and between the tubes and walls of the rod rim and rod hub assemblies when there is no frit in the interstices between the tubes. In the present instance, the glass tubes are fusing together where they contact, and the frit interposed in the interstices between the tubes is compacted by the expansion of the tube walls, and sinters and fuses to itself and to the tube walls.

The expansion of the tubes also places the bundled rods 52 in the rim and hub assemblies under pressure. The tube expansion promotes tight contact and thus promotes bonding or fusion of the assembly. The expansion of the tubes 22 promotes compaction of the frit in the interstices between rods during sintering or fusion.

Further, the tubes 22, frit 19, rods 52 and frit 59 are also preferably undergoing nucleation during the heat treatment, and heating of the assembly is continued for a time sufficient to in situ crystallize the tubes, rods and frit to an at least paritally crystalline material, commonly referred to as a glass-ceramic.

Well suited for use in the method of this invention are thermally crystallizable glasses that are convertible by heating to glass-ceramic bodies. As used herein, a glass-ceramic is an inorganic, essentially crystalline oxide ceramic material derived from an amorphous inorganic glass by in situ bulk thermal crystallization. Prior to thermal in situ bulk crystallization, the thermally crystallizable glasses can be drawn into tubing and rods using conventional glass forming techniques and equipment.

Thermally cyrstallizable glass compositions and the glass-ceramics resulting from thermal in situ crystallization thereof which are useful in the method and product of this invention are those which have, in their crystallized state, a coefficient of thermal expansion in the range from $-18$ to $+50 \times 10^{-7}/°$ C over the range $0°-300°$ C. The compositions usually used are those containing lithia, alumina and silica, together with one or more nucleating agents including $TiO_2$, $ZrO_2$, $SnO_2$, or other known nucleating agents. In general, such compositions containing in weight per cent about 64 to 79 $SiO_2$, about 13 to 25 $Al_2O_3$ and about 2 to 6 $Li_2O$, together with about 1.2 to 4 weight per cent of nucleating agents selected from one or more of $TiO_2$, $ZrO_2$ and $SnO_2$, can be employed. Preferably, not more than about 2.5 weight percent $TiO_2$ is usually used or the crystallization is undesirably rapid to be compatible with the fullest expansion of the tubes in the bloating process.

Other ingredients can be present in small amounts, as is understood in the art, such as even as much as 4 or 5 weight percent ZnO, up to as much as 3 or 4 weight percent CaO, up to as much as 8 percent MgO, and up to as much as 5 percent BaO, so long as the silica plus alumina plus lithia and the nucleating agent(s) are at least about 85, usually 90, weight percent of the total glass and the glass composition will thermally crystallize to a glass-ceramic having the desired low expansion of $-18$ to $+50 \times 10^{-7}/°$ C. Exemplary compositions which can be used in the process of the invention include those compositions disclosed in U.S. Pat. No. 3,380,818, those compositions disclosed in U.S. Ser. No. 464,147 filed June 15, 1965 (now abandoned), and corresponding British Patent No. 1,124,001 and No. 1,124,002, dated Dec. 9, 1968, those compositions disclosed in application Ser. No. 866,168 filed Oct. 13, 1969, now U.S. Pat. No. 3,625,718, and corresponding Netherlands printed patent application 6,805,259, and also those compositions set forth in U.S. Ser. No. 146,664 filed May 25, 1971, now abandoned in favor of U.S. Ser. No. 229,959, filed Feb. 28, 1972, which has since issued as U.S. Pat. No. 3,841,950.

Exemplary of suitable tube and rod compositions are the following specific formulations of Table I such compositions can also be used as the interposed ceramic material.

TABLE I

| INGREDIENT | WEIGHT PERCENT | | | |
|---|---|---|---|---|
| | I | II | III | IV |
| $SiO_2$ | 73.0 | 75.8 | 70.6 | 68.6 |
| $Al_2O_3$ | 17.65 | 16.8 | 19.7 | 21.3 |
| $Li_2O$ | 4.15 | 4.44 | 3.7 | 4.0 |
| ZnO | 1.7 | | 1.7 | |
| $TiO_2$ | 1.4 | 1.84 | 1.7 | 2.0 |
| $ZrO_2$ | 1.6 | 1.17 | 1.5 | 1.6 |
| $Na_2O$ | 0.1 | 0.55 | 0.4 | 0.4 |
| $Cl_2$ | 0.1 | | 0.1 | |
| $Sb_2O_3$ | 0.3 | | 0.5 | 0.3 |
| $K_2O$ | | | 0.2 | 0.2 |
| $F_2$ | | | 0.1 | |
| MgO | | | | 0.1 |

In any event, the thermally crystallizable glass tubings and rods in the lithia-alumina-silica field containing nucleating agents as before described, are assembled as previously set forth and the constrained bundles of sealed tubing (containing a heat expansible fluid) and rods are heated at any suitable rate that will not thermally shock the tubing and rods up to a temperature range in the maximum nucleating range of the glass. The maximum nucleation range can be determined for all such glasses by the general method outlined in Smith U.S. Pat. No. 3,380,818 beginning at column 9, line 43.

For the process of the present invention where sealing is to be effected or initiated while nucleation is occurring, it is preferred that the assembled tubes and rods be heated in the range 50° to 250° above the annealing point for a period of 1 hour or more. This time can be extended to 10 or 20 hours, and even longer times are not harmful. During this time of heating in such temperature range nucleation is effected, as well as fusion aided by pressure exerted by expansion of the entrapped fluid. Thereafter, the temperature is raised to a higher temperature than the first heating range, which higher temperature is at least 200° F above the annealing point temperature or may be as high as the final crystallization temperature (usually 1800° to 2300° F). The final crystallization can be effected at any such temperature range higher than the nucleation-expansion-fusion temperature (50° to 250° F above the annealing point temperature) and can be as low as 200° F above the annealing point or as high as 2300° F or as high as the upper liquidus temperature. If the final crystallization is effected at temperatures no more than 400° or 500° F above the annealing point, then the product will not have as high temperature stability as is desired for gas turbine use, but the product will be of the desired low expansion glass-ceramic.

In any event, in this second stage of heating further expansion and the beginning of crystallization is effected, followed by the completion of crystallization on continued heating to a degree such that the matrix material has an expansion in the range from $-18$ to $+50 \times 10^{-7}/°$ C over the range 0°–300° C.

While the temperature may be raised directly to the final crystallization temperature range at a suitable furnace heating rate usually in the range of 10° to 300° F per hour, it is usually preferred to allow crystallization to be effected slowly while further expansion of the tubes and concomitant fusion of tubes and rods is being effected by having an intermediate step between the first nucleation-and-fusion temperature range and the final crystallization temperature, which range is usually from 220° to about 700° F, usually from 200° to 500° F, above the annealing point of the original glass. Exemplary holding times in this intermediate range are from 1 to 8 hours, after which the assembly is heated up to the final crystallization temperature, usually in the range of from about 1800° to 2300° F.

Obviously, no specific heat treatment instructions can be given suitable for all thermally crystallizable glass compositions. As is well known, glass-ceramics do not have adequate strength if they are not sufficiently nucleated before crystals are allowed to grow appreciably in size, so that routine experiments known to those skilled in the art are used to determine what length of time is best to obtain an adequate number of crystallization centers or nuclei in the glass in the nucleation temperature range of 50° to 250° F above the annealing point.

Another point that must be kept in mind is that, if it is an object to obtain appreciable expansion beyond that necessary to get good fusion between the tubes, in other words to get appreciable reshaping of the tubes to fill the interstices between the tubing, one should not raise the temperature too slowly when going from the nucleation temperature range to the intermediate range, since a rigid crystalline network may begin to set in and to prevent further expansion. It is found some compositions can be heated at a rate as low as 10° F to 50° F per hour to this intermediate temperature range and still get sufficient expansion of the tubing effective to form the substantially hexagonal passages (round tubes used in close-packed configuration). On the other hand, some compositions have been found not to fully expand unless a higher heating rate from the initial nucleation-fusion temperature range to the intermediate temperature range is used, sometimes on the order of at least 200° F to 300° F per hour or higher.

The length of time of heating in the final crystallization temperature range of 1800° to about 2300° F is from ½ hour to 5 or 6 hours, although longer times are in no way deleterious. After the crystallization has been completed, the structure can be cooled at furnace rate or in air when the structure is of such low expansion that thermal shock will not harm it.

After the heat treatment just described, the product can now be cooled and the sealed ends of the tubes cut or ground away to open each tube to atmospheric pressure. Alternatively, if the intermediate step of crystallization heat treating at a temperature range of 200° to 700° F above the annealing point temperature is used, the heat treatment can be interrupted after this intermediate step and cooled somewhat or even cooled to room temperature, and the ends of the tubes cut or ground away and opened to atmospheric pressure. Then the assembly can be heated up again into the final crystallization heat treatment range, where further and final crystallization is effected. Further, the product can if desired have both tube ends left sealed for cellular material or one tube end left sealed, both products having uses noted in the Pei application.

As will be understood by those skilled in the art, the crystals of the matrix after the second stage of heat treatment may be in the beta-eucryptite or beta-eucryptite-like state, as is referred to in the referenced Smith U.S. Pat. No. 3,380,818, and already be highly crystallized and of a low expansion. The final heat treatment will cause further crystallization and conversion of the eucryptite-like crystals to beta-spodumene or beta-spodumene-like crystals, as is also described in the cited Smith patent.

We have found, when attempting to jointly thermally process an integral structure (such as shown in FIG. 12 for instance) partly made up of tubes and partly of a rod-frit structure, that in order to obtain sufficiently similar crystallizing characteristics the ratio of the diameter of the rods to the outside diameter of the tubes should be no more than 2:1, preferably no more than 1:1 and even better results are usually obtained when said ratio is no more than 1:2. Also making a rod-frit structure of this invention, whether or not in conjunction with making it integral with a tube structure, works best when the diameter of the largest rods (mixed rod sizes can of course be used) is no greater than about 0.3 inch, usually 0.2 inch, and in most applications rods of 0.01 to 0.1 inch diameter are used.

Referring to FIG. 14 there is illustrated a regenerator wheel 70 wherein the outer periphery of the rim 71 is provided with recesses 72. The recesses in a rim which is formed with rods and interstitially interposed frit may be formed by machining the recesses into the periphery of an annular rim, since the low expansion ceramic structural material formed from the rod assembly has good machinability. However, when making the recessed type rim from a rod assembly, it is advantageous to use a mold to form the rim in the desired shape.

The hub 75 of wheel 70 has its exterior wall formed in an octagonal shape to be illustrative of shapes that may be formed other than the annular shape shown hereinbefore. The octagonal or other non-circular shape of wall 76 may be used to impart driving force to the tube matrix portion of wheel 70 through the corners of the hexagon when a hub drive is used, rather than relying solely upon the fusion seal between a circular hub and the circular portion of a tube matrix receiving the hub. Similarly the triangularly shaped aperture 77 in hub 75 will receive a triangular drive shaft to impart driving motion to the wheel 70. The recesses 72 in wheel 70 illustrates a means for rim driving the wheel 70 in, e.g. a gas turbine engine.

FIGS. 13 and 15 are described in connection with the description of Example II.

The following examples will serve to illustrate the invention without in any way limiting it, since modifications will be readily apparent to those having ordinary skill in the art.

EXAMPLE I

Glass rods formed from composition I of Table I having an average diameter of 0.018 inch and an averge length of 3.5 inches are closely packed into hub molds and rim molds similar to that illustrated in FIG. 10 utilizing vibration as before described. The rods, prior to assembly in the mold, are coated with a slurry containing a mixture of powdered glass of −400 mesh of the same composition in a vehicle consisting of amyl acetate with 1.2 percent nitrocellulose, in a ratio of 3.5:1 to 2:1 (by weight) solids to vehicle.

After the hub and rim assemblies of rods and frit have dried to a state where the rods and frit are bound together by the binder in the vehicle, the outer hub mold and inner rim mold walls are removed and the area between the rod-frit hub and rod-frit rim assemblies similar to that illustrated in FIG. 1 is closely packed with glass tubing, sealed at both ends, formed from composition I of Table I, again using vibration. The tubing has an average outside diameter of 0.030 inch, an average inside diameter of 0.026 inch, an average wall thickness of 0.002 inch and an average length of 3.5 inches. The tubing is not coated with frit in this example.

The outer ring rim mold wall, rod-frit rim, tubing, rod-frit hub, and inner hub mold wall assembly is then heated in a kiln on the following schedule:

| Temperature | Time or Rate |
|---|---|
| Ambient to 900° F | 300° F/hr. |
| Hold at 900° F | Two hrs. |
| 900° F to 1350° F | 300° F/hr |
| Hold at 1350° F | Two hrs. |
| 1350° F to 2100° F | 300° F/hr. |
| Hold at 2100° F | Six hrs. |
| 2100° F to Room Temp. | 300° F/hr. |

The foregoing heat treatment expands and bonds and thermally in situ crystallizes the tubing, the rods and the frit interposed between the rods into an integral glass-ceramic matrix structure having an integral hub and rim. The tubing ends can be cut off or ground off to provide an open ended matrix structure which may be used as a regenerator wheel.

The vehicle used for the slurry is exemplary only and was chosen for the characteristics of a good initial drying speed provided by the amyl acetate solvent for the nitrocellulose, and for the ability of the nitrocellulose to bind the frit particles together to provide good green ware handling properties.

EXAMPLE II

A thermally crystallizable glass having the oxide composition of composition I of Table I, having an annealing point temperature of about 1300° F, was batched, melted and formed into glass rods, tubes and powder. The specific batch and melting conditions are shown on page 26 of said Serial No. 146,665 (abandoned) now Ser. No. 229,959, filed Feb. 28, 1972, now U.S. Pat. No. 3,841,950, which description is incorporated herein by reference.

The tubes had an average inside diameter of 0.025 inch and an average wall thickness of 0.0015 inch, and the rods had an average diameter of 0.018 inch. The powdered glass frit was −400 mesh. The average length of the rods and the tubing was 3.5 inches. The tubes were heat sealed at each end, entrapping air.

Eleven unfired, green lugs were made in the shape of a segment of a circle, as shown at 81 in FIG. 13 by inserting into split clay molds lined with plastic foil closely packed rods previously coated with the −400 mesh glass powder frit in a binder-solvent mixture of 1.2 percent nitrocellulose solution in amyl acetate in a ratio of 2.25 parts by weight of glass powder to one part by weight of solvent-binder mixture. The lugs were allowed to dry by evaporation of the amyl acetate thus leaving coherent green lugs to be used in the assembly to be described hereafter. Similarly, a 4 inch diameter green rod-frit circular center hub is made in a circular clay mold.

A circular rim of sintered silica refractory similar to that shown at 82 in FIG. 13 was made. The rim was 17 inches inside diameter and had a wall thickness of approximately 4 inches and a thickness or height of 4 inches. The rim was placed on a table equipped with a vibrator similar to that shown in FIG. 1. Beneath the rim were placed equally spaced steel bars of approximately ⅛ inch thickness by 2 inches wide and 8 inches long. The bars extended from outside the rim periphery radially toward the center of the sintered silica mold. A lug was cemented with wax to each of the bars with the flat side approximately ½ inch from the periphery of the silica mold. Similarly the green hub assembly as at 83 in FIG. 13 was cemented to a long ⅛ inch by 2 inch bar positioned below the silica mold along the line of the diameter thereof and extending outside the periphery of the mold. The internal surface of the silica mold was lined with woven quartz glass cloth. Thereafter sealed tubing coated with the same powdered glass slurry was packed in the remainder of the space within the silica mold, with intermittent vibration and addition of further tubings until a tightly packed structure was obtained. Thereafter, the ends of all of the metal bars were heated so that the heat was conducted along the length of the metal bars, thus melting the wax, and the bars were all removed. Thereafter, the lugs and the hub were pushed down to the level of the supporting table surface, coincident with the ends of the tubings. The tubings which had also been obstructed by the bars were also, of course, pushed down to the level of the table. The assembly was allowed to dry to evaporate the amyl acetate and thereafter was placed in a furnace and heat treated according to the following schedule:

| Heating rate, ° F./hr. | Temperature ° F. | Holding Time at Designated Temperature |
|---|---|---|
| 50 | to 900 | 2 |
| 50 | to 1200 | 0 |
| 20 | to 1300 | 0 |
| 5 | to 1375 | 24 |
| 5 | to 1400 | 0 |
| 10 | to 1700 | 0 |
| 5 | to 1725 | 24 |
| 10 | to 1800 | 6 |

-continued

| Heating rate, ° F./hr. | Temperature ° F. | Holding Time at Designated Temperature |
|---|---|---|
| 50 | to 1200 | 0 |
| Cooled at furnace rate to room temperature. | | |

The structure was at this point integrally bonded and crystallized and had shrunk slightly away from the silica mold, which was removed. Also, both sides of the structure were machined off to give two flat surfaces with all tubings open, leaving a total thickness of about 2.8 inches.

The crystalline glass-ceramic structure was again placed in the furnace and heat treated according to the following schedule:

| Heating Rate ° F/hr. | Temperature ° F. | Holding Time at Designated Temperature |
|---|---|---|
| 100 | to 1800 | 0 |
| 50 | to 2100 | 6 |
| 50 | to 1700 | 0 |
| 150 to room temperature, | | | thus producing the finally heat treated glass-ceramic structure. This structure was machined on the outside to make a circle of about 15.5 inches, thus removing the outer portion of the tubings and an outer portion of the lugs. The thickness of the lugs in the radial direction is about 1¼ inches. Finally, a center hole is drilled in the hub.

The finished glass-ceramic regenerator had a coefficient of thermal expansion of about $-8 \times 10^{-7}/°$ C over the range zero to 300° C. and about $-2.7 \times 10^{-7}$ over the range zero to 700° C., and the tubular portion of the regenerator had a free cross sectional open area of about 65 percent. The general configuration of the final regenerator wheel is illustrated in FIG. 15. Finally, cup-shaped depressions (not shown) are machined into the peripheral portions of each lug to receive clips for the drive mechanism.

For many applications, particularly when the matrix is used as a heat exchanger, a low expansion and heat/thermal shock resistant matrix is required. For instance, when used as a regenerator in a gas turbine, hot gas from the turbine can be passed through a rotating open-ended matrix in one direction, while cold incoming air is passed through the matrix in the opposite direction, picking up heat from the matrix passageways.

Therefore, a preferred embodiment of this invention utilizes thermally crystallizable glass compositions for the tubes which in their crystallized state, (1) have essentially zero porosity,
(2) consist essentially of an inorganic crystalline oxide ceramic material,
(3) have an average coefficient of lineal thermal expansion of about $-12$ to $+12 \times 10^{-7}/°$ C. in a range 0°–300° C. and preferably a coefficient of about $-5$ to $+5 \times 10^{-7}/°$ C in a range 0°–300° C. and
(4) a thermal conductivity of less than 0.01 cal/cm-/sec/cm²/° C at 400° C.

When the matrix tubes have such a coefficient of expansion it is preferred, also, that the expansion coefficient of the rods and interstitial frit material also be in the −12 to +12 (preferably −5 to +5) × $10^{-7}/°C$ range over the temperature range 0–300° C.

As used herein the term "glass-ceramic" is an inorganic crystalline oxide ceramic material containing a multiplicity of extremely small inorganic oxide crystals in random orientation throughout the mass of the material, which glass-ceramic is formed by the thermal in situ bulk crystallization of a glass.

Also as used herein the term "inner diameter" refers to the shortest distance through the center of the tube or passageway from one inner wall to the opposite inner wall. This distance is the same for all diameters of a circle, of course, but for a hexagon, for instance, the "diameter" defined herein is the distance of a line through the center of a hexagon and perpendicular to the opposite side walls of the hexagon.

While there have been shown and described and pointed out the fundamental novel features of the invention with a reference to the preferred embodiments thereof, those skilled in the art will recognize that various changes, substitutions, omissions and modifications in the methods and structures described may be made by those skilled in the art without departing from the spirit of the invention. For instance, the invention is applicable not only to thermally crystallizable glasses and frits that are thermally convertible to glass-ceramic and crystalline structures having an average lineal coefficient of expansion of −18 to +50 × $10_+^7$ per ° C over the range of zero to 300° C but also to the use of glasses and frits that crystallize to higher expansion structures, such as up to 200 × $10^{-7}/°$ C. Thus, the principles of the invention and the problem solved remain the same for the higher expansion final structures.

We claim:

1. A method of forming an integral structure having one or more solid, reinforced portion and a gas conducting portion, which comprises
   a. bundling together in a desired structure to correspond to a solid reinforced portion a plurality of axially elongated individual rods of thermally crystallizable glass with their axes parallel and in wall-to-wall contact with each other,
   b. providing additional sinterable ceramic material in the interstices between adjacent rods, said additional sinterable ceramic material having substantially the same thermal expansion characteristics as the sinterable ceramic rods when both are subjected to thermal treatment for converting the glass rods to a glass-ceramic,
   c. tightly packing together a plurality of axially elongated tubes of thermally crystallizable glass in a desired matrix configuration corresponding to said gas conducting portion of the structure, said tubes being adjacent to and against at least one side of said rod-frit structure, each of said tubes being sealed at their opposite axial ends and containing an expansible fluid medium, each of said tubes being essentially parallel to other tubes in the tube pack, said tubes having substantially the same thermal expansion characteristics as said rods and material interstitially disposed between the rods upon being subjected to said thermal treatment,
   d. constraining the tubes of the tube pack configuration in their position adjacent and against said rod-frit structure and against substantial movement in a direction perpendicular to their parallel tube alignment,
   e. subjecting the resultant composite structure to a temperature sufficient to soften the tubes and thus cause said fluid medium entrapped in said tubes to expand the tubes into tight contact with adjacent tubes and said adjacent rod-frit structure bonding such tubes of the gas conducting portion to each other and to said rod-frit solid portion as an integral structure,
   f. heating said structure to a temperature range above the upper temperature of step (e) to effect crystallization thereof to a glass-ceramic and thereafter cooling said structure,
   g. opening the opposite ends of the tubes at a time after completing step (e), thereby providing said gas conducting portion of said integral structure.

2. A method as defined in claim 1 in which rods are selected, with a diameter no more than twice the outside diameter of the tubes.

3. A method as defined in claim 1 in which rods are selected, with a diameter no more than the outside diameter of the tubes.

4. A method as defined in claim 1 in which rods are selected with a diameter no more than one-half the outside diameter of the tubes.

5. A method as defined in claim 1 which further includes interposing additional thermally crystallizable glass in the interstices between the tightly packed tubes, said additional thermally crystallizable glass having substantially the same thermal expansion characteristics as the tubes when both are crystallized to a glass-ceramic, the subjection of said tube pack to said softening temperature of step (e) then also resulting in the compaction between the fusion with the expanding tube walls of the tube pack interstitial glass.

6. A method of forming an integral structure of a low expansion glass-ceramic material having one or more coherent solid, reinforced portion and a gas conducting portion which comprises
   a. bundling together in a desired configuration to define said solid, reinforced portion a plurality of axially elongated individual sinterable rods with their axes parallel and in wall-to-wall contact with each other, said rods being comprised of a thermally crystallizable glass composition of weight percent in the range:
   $SiO_2$ 68.6 – 75.8
   $Al_2O_3$ 16.8 – 21.3
   $Li_2O$ 3.7 – 4.44
   $NaO_2$ 0.1 – 0.55
   $K_2O$ 0 – 0.2
   $MgO$ 0 – 0.1
   $ZnO$ 0 – 1.7
   $TiO_2$ 1.4 – 2.0
   $ZrO_2$ 1.17 – 1.6
   $Cl_2$ 0 – 0.1
   $Sb_2O_3$ 0.3 – 0.5
   $F_2$ 0 – 0.1
   b. filling the interstices between adjacent rods of said portion with additional sinterable glass of the composition set forth in step (a) and having substantially the same thermal expansion characteristics as the sinterable rods when both are subjected to a thermal treatment suitable for converting such glass to glass-ceramic,
   c. tightly packing together a plurality of axially elongated tubes of thermally crystallizable glass of a composition within the range of step (a) in a desired matrix configuration and corresponding to said gas conducting portion of the structure, said tubes being adjacent to and against at least one side of said rod-frit structure portion, each of said tubes being sealed at its opposite ends and containing a heat expansible fluid medium and the tubes being essentially parallel to other tubes of the gas conducting portion and to the rods of the reinforced portion of the structure, the glass of said tubes having substantially the same thermal expansion characteristics as said rods and interstitially disposed glass when all are subjected to a thermal treatment for converting them to glass-ceramic, d. constraining the tubes of said configuration in their position adjacent and against said rod configuration and against substantial movement in a direction normal to their parallel tube alignment, e. subjecting said constrained rods, interstitial glass and tubes to a temperature sufficient to soften said rods, said interstitial glass and said tubes and cause said fluid medium in said end sealed tubes to expand the tubes into tight contact with adjacent tubes and said adjacent rod-interstitial glass structure bonding such tubes of the gas conducting portion to each other and to said solid portion as an integral structure, said temperature being in the range of 50° to 250° F above the annealing point of the glass of the said constituents of said integral structure in which temperature range the glass thereof nucleates during said fusion, f. jointly heating said fused integral glass structure to a higher temperature than the temperature in step (e) in the range of 200° to 500° F above the said original annealing point of the glass, g. finally heating said fused structure in a temperature range from 1800°–2300° F for completing crystallization thereof to a glass-ceramic having an average coefficient of lineal thermal expansion of about $-18$ to $+15 \times 0 \ 10^{-7}/°$ C over the range of 0°–300° C, and thereafter cooling said structure, and h. opening the opposite sealed ends of the tubes at a time subsequent to performing step (e), thereby providing the gas conducting portion of said integral structure.

7. An integral structural product of a low expansion glass-ceramic having one or more coherent, solid, reinforced portion and a gas conducting portion manufactured according to the method defined in claim 6.

* * * * *

UNITED STATES PATENT OFFICE
CERTIFICATE OF CORRECTION

PATENT NO. : 4,020,896
DATED : May 3, 1977
INVENTOR(S) : Donald F. Mold, Ronald G. Rice It is certified that error appears in the above-identified patent and that said Letters Patent are hereby corrected as shown below:

Col. 1, line 8, delete "filed";
      line 10, before "in", insert --filed--;
      line 23, after "disclosed", insert --a--.

Col. 2, line 11, "cermaic" should be --ceramic--.

Col. 3, line 25, "cyrstalline" should be --crystalline--;
      line 38, "cermaic" should be --ceramic--;
      line 43, after "packed", delete the comma ",";
      line 61, "cermamic" should be --ceramic--.

Col. 8, line 68, "are" should be --as--.

Col. 10, line 56, "cyrstallizable" should be --crystallizable--.

Col. 11, line 16, "$10^{116}$" should be --$10^{-}$--.

Col. 14, line 3, "illustrates" should be --illustrate--.

UNITED STATES PATENT OFFICE
CERTIFICATE OF CORRECTION

PATENT NO. : 4,020,896
DATED : May 3, 1977
INVENTOR(S) : Donald F. Mold, Ronald G. Rice It is certified that error appears in the above-identified patent and that said Letters Patent are hereby corrected as shown below:

Col. 18, line 67 (Claim 6), before "step", insert --glass of--.

Col. 20, line 14 (claim 6), "XO" should be --X--.

Signed and Sealed this

Twenty-fifth Day of April 1978

[SEAL]

Attest:

RUTH C. MASON
Attesting Officer

LUTRELLE F. PARKER
Acting Commissioner of Patents and Trademarks